Sept. 21, 1965     R. A. HALBERG     3,207,400
INTERMITTENT FEED MEASURING MECHANISM
Original Filed April 27, 1961
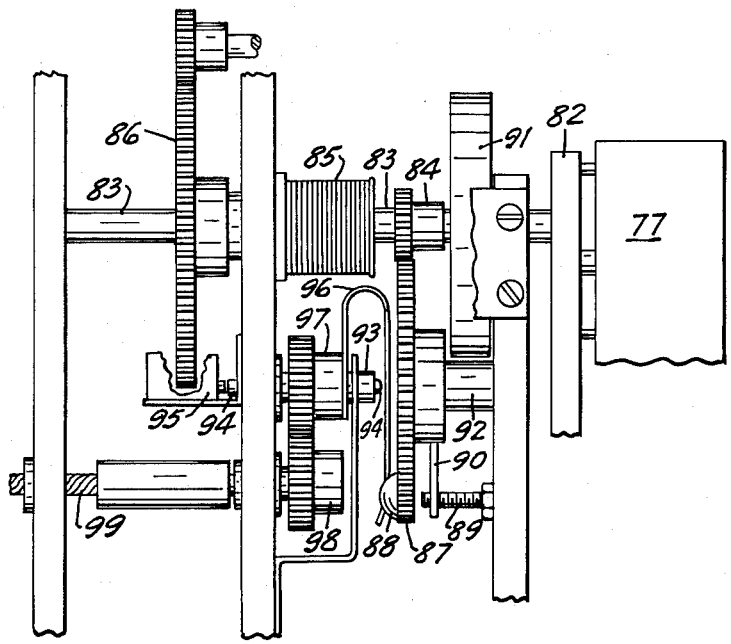
INVENTOR.
ROBERT A. HALBERG
BY
Carpenter, Kinney & Boulter
ATTORNEYS United States Patent Office 3,207,400
Patented Sept. 21, 1965

3,207,400
INTERMITTENT FEED MEASURING MECHANISM
Robert A. Halberg, West St. Paul, Minn., assignor to Minnesota Mining and Manufacturing Company, St. Paul, Minn., a corporation of Delaware
Original application Apr. 27, 1961, Ser. No. 106,039. Divided and this application Nov. 1, 1963, Ser. No. 325,199
1 Claim. (Cl. 226—136)

This invention relates to a variable feed measuring mechanism for sheet material, such as photosensitive paper or film. This application is a division of U.S. Serial No. 106,039, filed April 27, 1961, now Patent No. 3,181,416.

For many years the darkroom enlarger has been conventional equipment in both the commercial and home photographic laboratory. Recently equipment has been developed which permits both viewing and printing of a visible image in varying degrees of enlargement. In order to minimize waste of the photosensitive film or paper it is desirable to control the amount of film or paper being fed into the development section of the equipment in accordance with the amount of film or paper exposed to the light image. Reliability and simplicity of operation are obviously important factors in a device to accomplish these purposes.

It is an object of this invention to provide a variable feed measuring device to minimize waste of film or paper.

For purposes of convenience and clarity, the description of the device of this invention will refer to the figure.

The figure is a side view of the film or paper measuring device, partly broken away to show detail and partly in schematic.

In the paper or sheet measuring device of the figure, developer drive motor 77 contains a pop-out rotor connected to a shaft which engages the reduction gears in gear box 82 only when the motor is energized. Power drive shafts 83 and 83' transmit the power output of the reduction gear box 82 to gear 84 and to developer roll drive gear 86 on shaft 83' through single acting clutch 85. Gear 86 drives the paper or sheet feed roll and, because of single acting clutch 85, is capable of rotation in only one direction. Spring 91 connects to shaft 83 and is so disposed as to oppose the motor driven direction of rotation of shaft 83. Gear 84 is permanently coupled to measuring gear 87 and transmits power to measuring gear 87. Measuring gear 87, which has a stud or boss 88 on the peripheral edge of its outer face, is rotatably mounted at the free end of axle 92, the other end of which is affixed to the frame or a suitable fixed member. Arm 90 is attached to measuring gear 87 and, when no power is supplied to the motor, is maintained, by the tension of spring 91, in contact with stop 89 extending outwardly from the frame. Opposite the outer face of measuring gear 87 and aligned with the axis thereof is hollow shaft 93 on which is rotably mounted gear 97. To gear 97 is affixed U-shaped spring arm 96, the free end of which is in close parallel relationship to the outer face of measuring gear 87. Sliding pin 94 is positioned in hollow shaft 93 and extends slightly from the open end thereof. The other end of pin 94 is connected to spring switch 95, which it activates when depressed. Spring switch 95 is located in the circuit supplying electrical power to motor 77. Gear 97 and therefore spring arm 96 can be rotated from an external knob or control through a flexible cable 99 and intermediate gear 98.

In operation on a variable enlarger and printer for image reproduction, this paper feed device is generally used in conjunction with a variable mast, since the positioning of such a mask can be made to effectively regulate the length of photosensitive paper that will be struck by the projected image. The paper feed device can be integrally connected with the mask to automatically feed the proper length of photosensitive paper for a particular mask setting, or the viewing screeen of an enlarger-viewer apparatus can be suitably calibrated and the paper device can be separately operated and controlled in accordance with the appropriate scale reading appearing on the viewing screen. The external control of flexible cable 99 permits rotation of gear 97 and positioning of the free end of spring arm 96 to any desired points adjacent the outer face of measuring gear 87 at the periphery thereof. In a daylight enlarger as described in U.S. Serial No. 106,039, filed April 27, 1961, exposure of the photosensitive copypaper the developing sequence is initiated, the motor 77 is activated, and the pop-out rotor engages gear chain 82 and drives gear 86 through clutch 85, thus rotating the feed roll to advance the paper or film. The rotation of shaft 83 also overcomes the opposition of spring 91, increasing the tension in said spring, and drives measuring gear 87, which rotates until stud 88 contacts the free end of flexible spring 96. This forces spring 96 away from the outer face of gear 87, thereby depressing pin 94 and actuating switch 95 to shut off power to the motor 77. With the motor deenergized, the pop-out rotor disengages from the gear chain 82, permitting the tension in spring 91 to reverse the direction of rotation of measuring gear 87 until arm 90 once again contacts stop 89, the original starting position. During the reverse rotation of measuring gear 87, no power is transmitted to gear 86 because of the slippage of single-acting clutch 85. The paper feed device thus resets itself for another developing cycle.

Although in the embodiment illustrated only the essential parts are shown and described in detail in order to facilitate comprehension of the principles involved, it will be understood that modifications can readily be made without departing from the scope of the invention.

I claim:
A variable feed device for paper, film and the like which comprises a feed roll, a supported rotatable drive shaft, a power source for said drive shaft, disengageable coupling means between said power source and said drive shaft which is engageable only when said power source is activated, means for biasing said drive shaft counter to the direction of rotation provided by said power source, stop means to limit counter rotation of said drive shaft, a single acting clutch operated by said drive shaft, a power transmission shaft connected to the output of said clutch, means for connecting said power transmission shaft to said feed roll, said clutch being only capable of transmitting unidirectional rotation to said power transmission shaft when said power source is activated, a measuring gear permanently coupled to said drive shaft and being rotatably mounted on a supported shaft, a non-axially disposed boss on one face of said measuring gear, an electrical switch for activating said power source, said switch having an actuating member in close axial relationship to the aforesaid face of said measuring gear, a spring arm adjustably located between said activating member and the aforesaid face and in such relationship to said measuring gear face as to contact said boss upon rotation of said measuring gear, thereby to trip said switch actuating member and operate said switch, and means for adjusting the position of said spring arm to provide such contact after a predetermined rotation of said measuring gear, thus to provide a predetermined rotation of said power transmission shaft.

References Cited by the Examiner

UNITED STATES PATENTS 2,737,278  3/56  Bartelt _____ 192—142 X
2,984,012  5/61  Groll _____ 226—134 X M. HENSON WOOD, Jr., *Primary Examiner.*
ROBERT B. REEVES, *Examiner.*